3,488,301
PROCESS FOR PREPARING A VULCANIZABLE RUBBER PRODUCT WITH HARDENED GELATIN DISTRIBUTED THROUGHOUT
Tsutomu Kawashima, Matsudo-shi, Japan, assignor to Nihon Hikaku Kabushiki Kaisha, Tokyo, Japan
No Drawing. Filed Oct. 9, 1967, Ser. No. 673,978
Claims priority, application Japan, Oct. 11, 1966, 41/66,408
Int. Cl. C08d 9/02
U.S. Cl. 260—8                                6 Claims

ABSTRACT OF THE DISCLOSURE

Improvement of rubber product in which hardened gelatin which dissolves or deforms in boiling water within 5–10 minutes is distributed throughout said rubber product, said hardened gelatin being produced by treating gelatin with chemical tanning agent, with ultraviolet ray irradiation or by heating.

BACKGROUND OF THE INVENTION

A process for adding gelatin to and roller mixing the same with a rubber compound for the purpose of producing a rubber product having hygroscopicity and antistatic property is already known. In the prior art, gelatin is dissolved in hot water, the gelatin solution is gelated by cooling and then the gelatin is blended with the rubber compound by roller mixing. With this process, a long dissolving time is required and many difficulties are encountered in obtaining a highly concentrated solution of gelatin. When gelated gelatin is roller mixed with a rubber compound, the gelatinized rubber does not adhere well to the mixing rollers, it often peels and drops off from said rollers during the blending, and, therefore, each time it is necessary to pick up the fallen blend and put it back on said rollers. The reason for this poor adhesion is considered to be due to the large amount of water in the gel. Further, it takes considerable time to roller mix the gelated gelatin with a rubber compound, so the gelated gelatin which is not sufficiently distributed in the rubber compound contacts the surface of the roller directly, and dries and solidifies, and these particles of pure gelatin are distributed throughout the rubber-gelatin blend. So the quality of the product obtained is poor. Also, the maximum concentration of an aqueous solution of gelatin that can be obtained is about 50%; accordingly, the blending of about 50% or more by weight of gelatin with the rubber compound has been very difficult, if not impossible, and industrially about 30% by weight has been the usual limit. The reason for such obstacles in roller mixing of gelatin with rubber in the conventional process is believed to be the large amount of moisture existing in gelated gelatin.

SUMMARY OF THE INVENTION

Gelatin is a protein obtained from hide, bone and tendon. A lower quality gelatin is also called glue. The term "gelatin" in this specification and claims includes glue.

The present invention is characterized by blending particles of hardened gelatin, said particles being made by pulverizing hardened gelatin in sheet and fibrous form or by drying hardened particles of gelatin jelly, swelling the particles in water, then roller mixing the water-swollen particles with a rubber compound.

Various processes for hardening gelatin have previously been proposed. These include (1) treating gelatin with a tanning agent such as aluminum sulfate, alum and formaldehyde and (2) heating or irradiation by ultraviolet ray to cross-linkage. In order to uniformly and easily disperse particles of hardened gelatin in a rubber compound, it is necessary that these particles be somewhat swollen by water, but that they remain as individual separate particles. It has been found that hardening to the point where the gelatin particles dissolve in boiling water within 5–10 minutes is sufficient. In order to obtain gelatin hardened to such an extent, jelly obtained in a step of producing gelatin from hide, tendon or bone is made into sheet form; thereafter, if desired, it is pulverized to make it particulate, hardened by immersing in a 5–10% aqueous solution of alum for several hours, then followed by washing with water, drying and pulverization. One pulverizing treatment is not sufficient to reduce the gelatin to finely divided particles of uniform size; it is necessary to repeat pulverization and screening several times.

In another hardening process, an aqueous solution of gelatin is spun into a coagulating bath consisting of concentrated aqueous solutions of inorganic salts, and the obtained wet filaments are treated with the tanning agent and dried as mentioned above. With just one pulverizing treatment and in a shorter time, the hardened gelatin filaments produced by this process give particles passing through a sieve having opening 0.3–0.5 mm. or less.

The hardened gelatin particles are put in water and stirred until the particles are uniformly wet. Subsequently, the mixture is left to stand for a predetermined time until a swollen gelatin is obtained. Because hardening treatment has already been applied to the gelatin, the particles do not coagulate after swelling to become a mass, but, rather, a particulate state is maintained. Accordingly, it is possible to uniformly spread a small amount of hardened particles at one time onto a rubber compound during roller mixing and optionally control the ratio of spreading. Further, because the amount of water contained in swollen gelatin is small as compared with gelated gelatin, there is no fear that the gelatin-rubber blend will peel off the mixing rollers and fall, or that dry solid particles of gelatin will result. Further, gelatin is uniformly distributed throughout a rubber compound within a short time. A further important merit of the process is that it is possible to add 50–70% by weight of gelatin to a rubber compound, a proportion impossible in the conventional processes. As a result, the obtained rubber product has greater hygroscopicity and less static charge. Therefore, the product is useful in the textile industry as a rubber covering for rollers and for shoe soles.

EXAMPLE 1

Gelatin was poured into hot water to obtain an aqueous solution of a concentration of 20–40% by weight; the solution was kept at 40–50 C. within a spinning tank and defoamed to make it a spinning solution. The solution was extruded through a nozzle into a coagulating bath comprising an aqueous saturated solution of ammonium sulfate kept at about 20 C. to obtain filaments without applying drawing. These filaments were treated in a hardening bath comprised of 10 parts of aluminum sulfate, 10 parts of ammonium sulfate and 80 parts of water, the pH of which was adjusted to 3.5 by sodium carbonate. The hardening time varies depending upon the denier of the filaments, the filaments are treated for 5–10 hours to harden them to the extent that the hardened filaments dissolve or deform in boiling water within 5–10 minutes. The hardened filaments were then washed with water for about 1 hour and dried. The hardened filaments were pulverized, and particles of a size less than 0.5 mm. were thus obtained by one step treatment.

Using the particulate gelatin so obtained, a gelatin-rubber blend was produced using the following components.

|   | Parts |
|---|---|
| Styrene-butadiene synthetic rubber | 100 |
| Particulate gelatin | 20 |
| Rubber additives (calcium carbonate, surface active agent, carbon black and vulcanizing agent) | 50 |

While roller mixing 100 parts of the synthetic rubber by conventional mixing rollers, 50 parts of calcium carbonate, surface active agent, carbon black and vulcanizing agent were added thereto, and the mixture was uniformly roller mixed.

On the other hand, water was added to 20 parts of particulate gelatin in an amount of 20% by weight, the mixture was mixed until the particles were thoroughly wet, thereafter it was let stand for 20–30 minutes until all particles had swollen. However, the swollen gelatin did not become a mass; each particle remained separate and independent. The swollen particulate gelatin was added, a small amount at one time, to said rubber blend and the mixture was roller mixed. During roller mixing, there was no peeling off and dropping out of said blend from the mixing rollers and the gelatin did not become a dry solid, the roller mixing was completed in about ⅕ the time required for the conventional process. The product was useful as a cover for a roller used in spinning fibers.

EXAMPLE 2

|   | Parts |
|---|---|
| Styrene-butadiene synthetic rubber | 100 |
| Particulate gelatin | 50 |
| Rubber additives | 50 |

The above-mentioned ingredients were blended and rubber mixed with gelatin was obtained as in Example 1.

Rollers for spinning covered with the rubber blend obtained in Examples 1 and 2 were compared with rubber covers to which gelatin was not added. The amounts of water absorbed, the electric specific electric resistances and degrees of swelling were measured.

The amount of water absorbed was determined by the increase in weight after a sample was immersed in warm water at 50 C. for 1 hour. The specific electric resistance was measured at 25° C. and in humidity of 60%. The degree of swelling was determined by expansion of volume after a sample of particles was immersed in petroleum ether for 48 hours at room temperature (20–25° C.).

| Proportion of gelatin to rubber added, percent | Amount of water absorbed, percent | Specific electric resistance, cm. | Degree of swelling, percent |
|---|---|---|---|
| 0 | 0.5 | $7.1 \times 10^{14}$ | 61.6 |
| 20 | 2.5–3.0 |  |  |
| 50 | 3.5–4.0 | $4.00 \times 10^{9}$ | 28.6 |

What is claimed is:

1. In a process of preparing a vulcanizable rubber product by blending finely divided gelatin particles with a vulcanizable rubber compound, the steps of hardening the gelatin with an aluminum salt selected from the group consisting of alum and aluminum sulfate until the gelatin is insoluble in cold water and dissolves in boiling water within a period of five to ten minutes, swelling the hardened gelatin particles by soaking the same in water before they are blended with the vulcanizable rubber compound, and mixing the swollen hardened gelatin particles in the particulate state with the vulcanizable rubber compound in a roller mill.

2. A process according to claim 1, wherein the gelatin is hardened by immersion into a 5–10% aqueous solution of the alum salt for a period of several hours.

3. A process according to claim 1 wherein said finely divided particles of gelatin are produced by pulverizing filaments obtained by spinning an aquous solution of gelatin into a coagulating bath comprised of an aqueous solution of a neutral salt, hardening, washing with water and drying the spun filaments.

4. A process according to claim 1 wherein said finely divided particles of gelatin are produced by hardening solid gelatin, thereafter pulverizing and sifting the hardened gelatin.

5. A process according to claim 1 wherein said finely divided particles of hardened gelatin before soaking in water have a size of less than 0.5 mm.

6. A process according to claim 1 wherein said finely divided particles of hardened gelatin constitute no more than 70% by weight of said vulcanizable rubber compound.

References Cited

UNITED STATES PATENTS

| 2,804,678 | 9/1957 | Rockoff | 260—8 |
| 2,858,283 | 10/1958 | Garrett | 260—8 |
| 3,004,936 | 10/1961 | Howland et al. | 260—8 |
| 3,297,780 | 1/1967 | Janssen | 260—747 |

FOREIGN PATENTS

| 9,464 | 1897 | Great Britain. |
| 161,482 | 4/1921 | Great Britain. |

OTHER REFERENCES

"Green Bone Glue in Silene 'EF'—GRS Compounds," July 22, 1946, Standard Chemical Company.

"Styrene-Butadiene Rubber Adhesives," Anderson et al., Handbook of Adhesives (Skeist) 1964, TP968 S5.

WILLIAM H. SHORT, Primary Examiner

E. WOODBERRY, Assistant Examiner